United States Patent [19]

Coucher

[11] 4,006,846
[45] Feb. 8, 1977

[54] INDEXING POWDER DISPENSING DEVICE
[75] Inventor: Robert G. Coucher, Salt Lake City, Utah
[73] Assignee: EPPCO, Salt Lake City, Utah
[22] Filed: Jan. 30, 1976
[21] Appl. No.: 653,785
[52] U.S. Cl. .............................. 222/194; 222/370
[51] Int. Cl.[2] .......................................... B67D 5/54
[58] Field of Search .......... 222/195, 194, 370, 406; 221/265, 278, 79, 81, 64

[56] References Cited
UNITED STATES PATENTS

| | | | |
|---|---|---|---|
| 2,152,632 | 4/1939 | Cassiere | 222/194 X |
| 3,007,612 | 11/1961 | Tepper | 222/370 X |
| 3,195,776 | 7/1965 | Helm et al. | 222/370 X |
| 3,260,408 | 7/1966 | Smitzer et al. | 222/194 X |
| 3,269,612 | 8/1966 | Bode | 222/370 X |

Primary Examiner—Stanley H. Tollberg
Attorney, Agent, or Firm—Trask & Britt

[57] ABSTRACT

A powder dispensing device which includes an indexing motor for incrementally rotating a flexible rotor wheel fitted with a plurality of spaced apart, open ended metering chambers. The device is designed to allow the metering chamber to fill with powder while rotating within a powder reservoir and to selectively register with a peripherally sealable tubular outlet through which the powder collected therein can be pneumatically ejected. The indexing motor includes a sectored drive gear loosely held about an elongated shaft fixed at its lower end to a pin wheel having a number of spaced apart bored openings. The bored openings hold a plurality of vertically slidable pins which selectively engage the sectored drive gear. A pneumatic piston cooperatively connected to a tooth-rack gear is provided for moving the sectored drive gear incrementally.

18 Claims, 10 Drawing Figures

INDEXING POWDER DISPENSING DEVICE

BACKGROUND OF THE INVENTION

1. Field of the Invention

This invention relates to a pulsating powder feeder and particularly to a powder feeder employing an indexing system for intermittently positioning powder metering chambers and ejecting reproducible amounts of a powder therefrom.

2. State of the Art

Numerous types of devices have been disclosed in the prior art for dispensing powder on a continuous or intermittent basis. In most cases the devices disclosed dispense a continuous flow of powder for use in spraying or coating operations. However, recently several patents have been issued which disclose a device for intermittently dispensing reproducible quanta of powder on a substrate. For example, U.S. Pat. No. 3,909,068 discloses a device employing a series of discs whereby one of the discs contains a number of ports designed to hold reproducible quanta of powder. Another series of ports, on the same disc, direct intermittent pulses of a pressurized gas into the powder ports forcing the powder outwardly through a nozzled outlet.

U.S. Pat. No. 3,913,795 discloses a powder metering device having pulsating characteristics similar to that described above. However, functionally it is distinguishable as it contains an open ended metering chamber specifically designed to move reciprocatably through a powder reservoir. As the metering chamber moves therethrough it is filled with powder and during its reciprocating movement comes into sealed contact with a normally closed opening. A pulse of pressurized gas is then introduced into the other end of the metering chamber causing the normally closed outlet to open and thereby force the powder collected within the chamber outwardly through a nozzled outlet.

Although the above devices have been found to be successful for most types of coating operations, it has now been found that the efficiency and reproducibility of the powder ejection process can be substantially increased if the rotating discs or the reciprocating piston of the prior art devices are replaced by a flexible rotor containing open ended metering chambers and if intermittent movement of the rotor wheel is accomplished by means of a specially designed indexing motor.

OBJECTS OF THE INVENTION

It is a primary object of this invention to provide a powder dispensing device for ejecting reproducible amounts of powder on a substrate. Another object of this invention is to provide a powder dispensing device which does not utilize a series of rotating discs or reciprocating pistons as a means for obtaining reproducible quanta of powder. Another object is to provide a powder dispensing device adapted with a flexible rotor having a plurality of open ended powder metering chambers fixed thereto. Still another object of this invention is to provide a powder dispensing device which utilizes an indexing motor for moving a plurality of powder metering chambers through a powder reservoir on an incremental basis. Still another object of this invention is to provide a reliable powder dispensing device for dispensing reproducible quanta of powder on a substrate such as the internal walls of a container. Another object is to provide a system for coating the internal walls of an open ended cylindrical container on a continous and reproducible basis. Other objects of this invention will be readily apparent from the description which follows.

SUMMARY OF THE INVENTION

These and other objects of this invention are achieved by the powder dispensing device herein disclosed and described and comprising generally an upper housing member having a powder outlet and powder inlet communicatively joined to a powder reservoir, an elongated shaft vertically positioned for rotation within said powder reservoir and a flexible rotor wheel fixed at the upper end section of said rotatable shaft. The peripheral section of said flexible rotor wheel is fixed with a number of evenly spaced, open ended metering chambers. As the rotor wheel is rotated incrementally through the powder reservoir, the powder metering chambers are filled with powder and positioned automatically in aligned registry with a peripherally sealed outlet through which the powder is ejected by means of a pulsating pressurized gas. The flexible rotor wheel is rotated by means of an indexing motor carried within a bottom or lower housing member mounted beneath the upper housing. The elongated shaft extends downwardly from the upper housing and into the lower housing. A pin wheel having a plurality of evenly spaced circumferentially bored openings is mounted to the lower end section of the shaft. Each of the bored openings loosely house a cylindrical pin or rod which is selectively raised or lowered by means of a lower and upper biasing means respectively. The lower biasing means is positioned so that each pin can selectively intercept a sectored drive gear loosely held on said shaft in a plane above and in proximal relation to said pin wheel. A means is also provided for incrementally indexing said sectored drive wheel and thereby position each of said powder metering chambers in aligned registery with a peripherally sealable powder outlet. Additional means is provided for maintaining said powder reservoir with the desired amount of powder as well as a means for selectively ejecting pulses of powder from the metering chambers as each of said chambers comes into registry with the peripherally sealed powder outlet.

The above powder metering device is readily adaptable to a system for spraying internal walls of an open ended container whereby said system includes a means for preheating the open ended container, a powder metering device, as herein above described, for introducing a reproducible quanta of powder along the inner walls of the container, a means for recovering powder which fails to adhere thereto and a means for curing or fixing the powder deposited on the internal walls of the container.

DESCRIPTION OF THE PREFERRED EMBODIMENT

Figure 1:
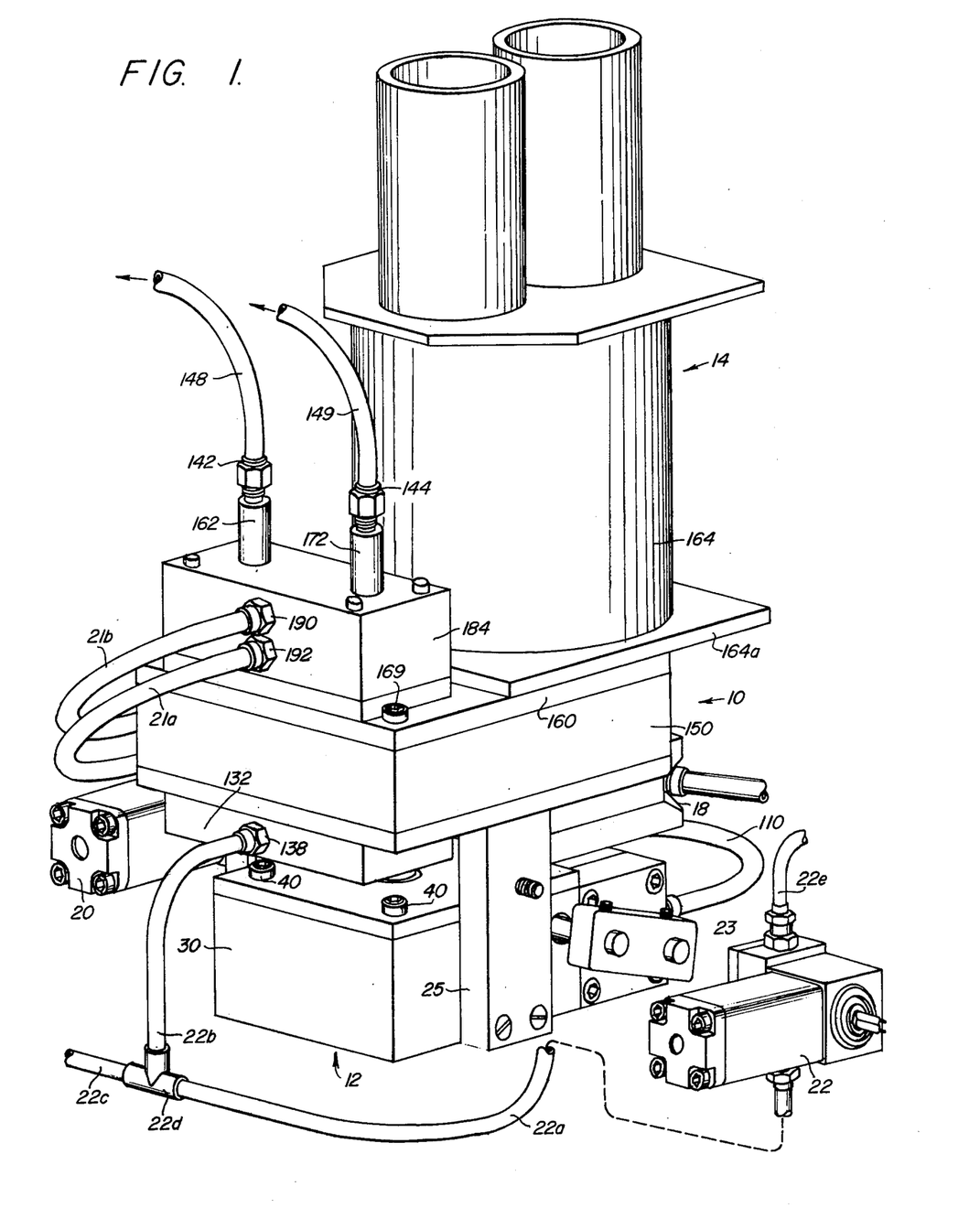
FIG. 1 is a pictorial representation of the powder metering device of this invention.

As shown in FIG. 1, the device of this invention includes generally an upper and lower housing, represented by numbers 10 and 12 respectively. The upper housing includes a vertically mounted outer storage container or hopper 14, a pair of powder outlet nozzles 16 and 17 (FIG. 3) and a powder vibrating means 18, carried between the upper and lower housings. The lower housing 12 includes a pair of solenoids 20 and 22, a pair of brackets 25 fixed to the side walls of the bottom housing 12 and the bottom wall of the upper housing 10. An indexing motor 23 is housed in part within the lower housing. Upon receiving an electrical impulse, solenoid 20 introduces intermittent pulses of pressurized gas through lines 21a and 21b which actuates a pair of pneumatic pistons communicatively connected to the nozzled outlets and into sealed engagement with the metering chambers housed within the upper housing. Solenoid 20 also actuates, concomitantly therewith, a pneumatic piston which is operatively connected to the indexing motor by first introducing air through line 108 then through line 110. Solenoid 22, fixed to the other bracket 25, releases pulses of pressurized gas through line 22a and 22b for ejecting the powder collected within the metering chambers outwardly through the nozzled outlets 16 and 17. A portion of the released gas passes through "T" 22d and line 22c for use in nozzle amplification. An air source provides air to solenoid 22 through line 22c.

Figure 3:
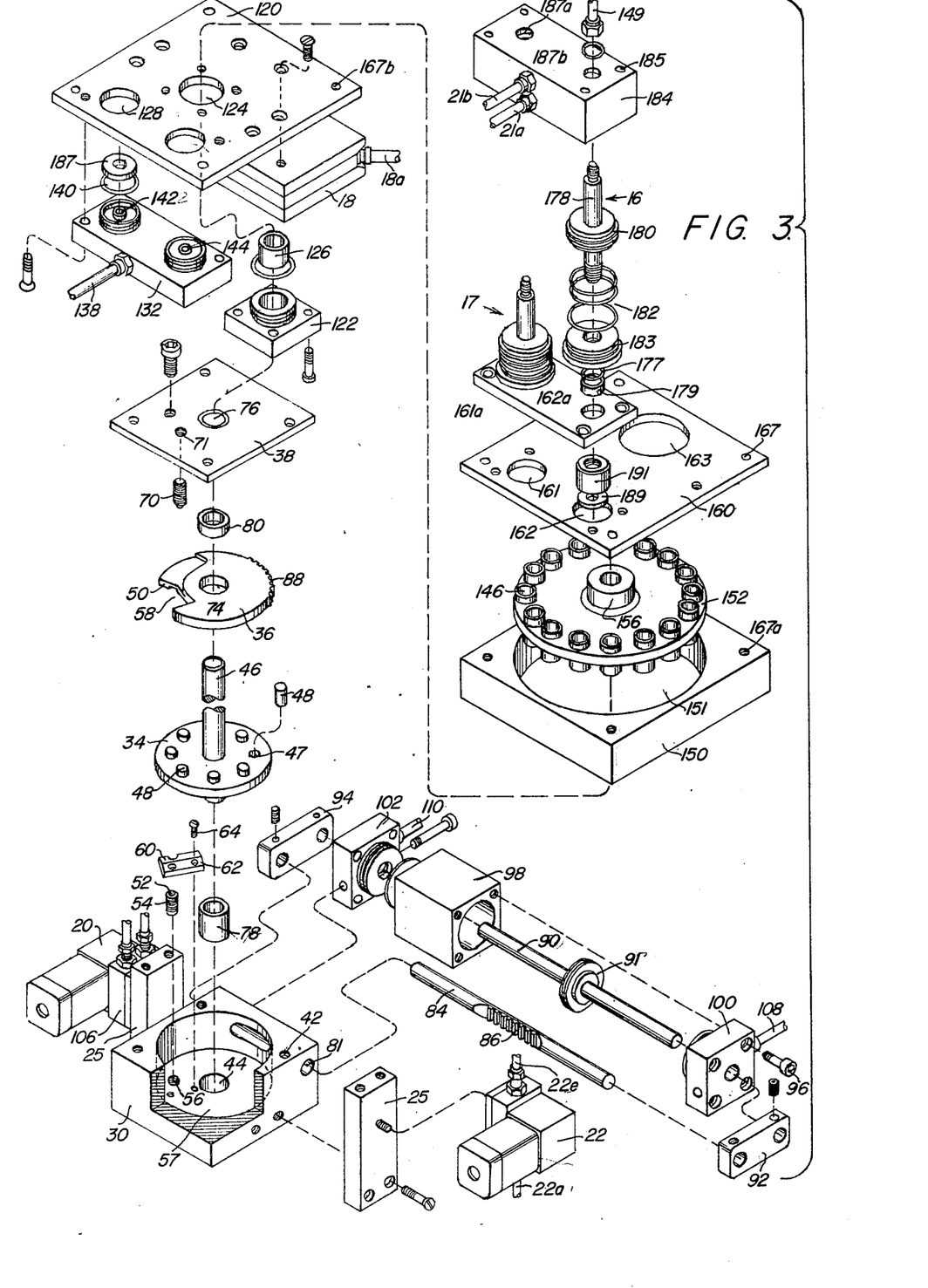
FIG. 3 is an exploded view showing the various integral parts of the powder metering device depicted in FIG. 1.
Figure 4:
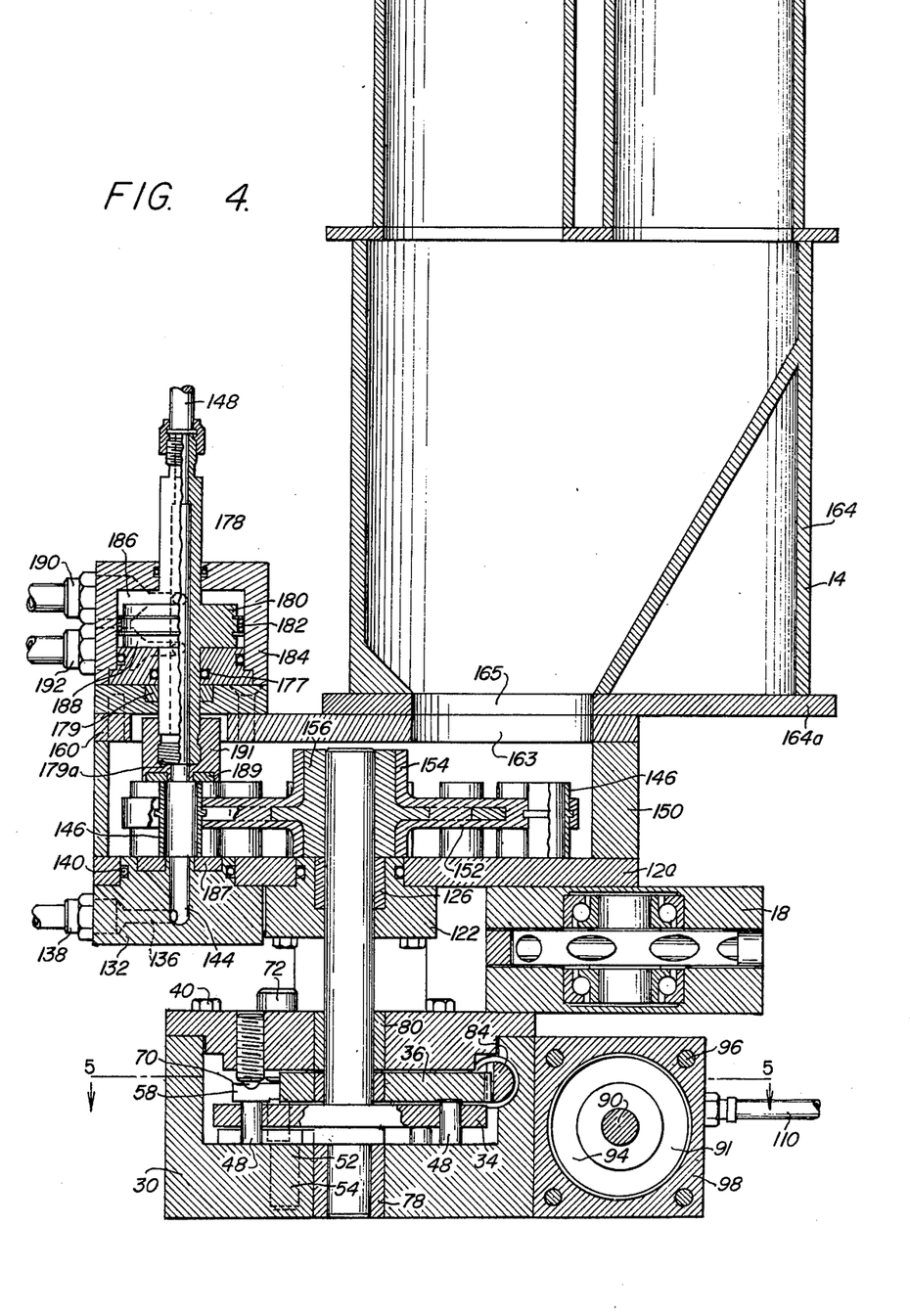
FIG. 4 is a vertical cross-sectional view taken just above the sectored drive gear and along line 4—4 of FIG. 2.
Figure 5:
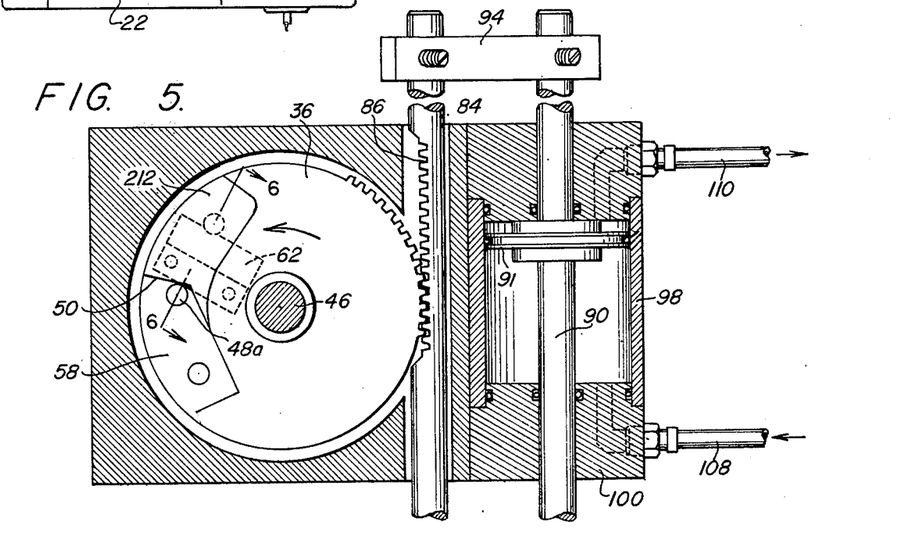
FIG. 5 is a horizontal cross-sectional view taken just above the sectored drive gear and along line 5—5 of FIG. 4.

As more clearly shown in the exploded view of FIG. 3 and the cross-sectional view shown in FIG. 4, the lower support housing 12 includes a bottom base block housing member 30, having a hollow annular central portion 32, which houses a pin wheel 34 and a sectored drive gear 36. The bottom base block housing member 30 is covered by a cover plate 38 and fastened thereto by four bolts 40 passing through the cover plate and into a threaded opening 42 bored into each corner section of the bottom based block housing member 30. The bottom base block housing member has a bored central opening 44 for receiving an elongated shaft 46 fixed to the pin wheel 34. The pin wheel 34 is a metallic disc having a plurality of circumferentially positioned bored openings 47 each loosely holding an elongated rod or pin 48. The pins 48 are designed to move vertically within the bored openings 47 to engage at preselected intervals the leading edge 50 of the sectored drive gear 36 loosely held about shaft 46. To insure that the pin moves vertically and upwardly and thereby properly engages the sectored gears leading edge 50, a ball 52 biased by a spring 54 housed in a bored opening 56, bored in the bottom wall 57 of the annular central portion 32 of the bottom base block housing member 30. The bored opening 56 is tapered to a diameter slightly less than the diameter of the ball 52, and thereby preventing the ball from escaping therefrom. The ball 52 and spring 54 is contained within the above opening by a sheared or recessed threaded bolt 53 screwed within the opening from the reverse side of the bottom base block housing member 30. As the sectored drive gear 36 is rotated about the stationary elongated shaft 46 in a clockwise direction, one of the pins 48a (see FIG. 8) carried by the pin wheel will come into the cut-out sectored portion 58 of the sectored drive gear 36 and against its leading edge 50. At this point in time the rotation of the sectored drive gear is reversed causing it to rotate in a now counterclockwise direction forcing the raised pin to move up the inclined edge 60 or a ramp 62, mounted to the floor or bottom wall 57 of the bottom base block housing member 30, by bolts or screws 64. Movement of pin 48a is shown in phantom in FIG. 8. When the sectored gear completes its rotation, whcih in the embodiment shown is approximately 45°, the raised pin is force downwardly by a second biased ball 70 housed in a tapered opening 71 bored in the cover plate 38. This biased ball 70 is identical to the lower ball and spring previously described and held within opening 56 by threaded bolt 72 (see FIG. 4). The movement of the pin and the arrangement of the biased balls can be best seen in FIGS. 6 and 8, which will subsequently be described in greater detail. In addition, the purpose and function for the vertical back edge 74 of the inclined ramp will likewise be discussed in greater detail.

The cover plate 38 contains a centrally bored opening 76 through which shaft 46 passes. To minimize frictional wear of the shaft 46 and the sectored drive gear 36 which is loosely held about shaft 46, the openings 76 and 44 are fitted with bushings 78 and 80 respectively.

To provide the first clockwise movement and then counterclockwise movement of the sectored drive gear 36, the bottom base block housing member 30 contains a longitudinal bore 81 along one side thereof to receive a tooth rack gear 84. The tooth portion 86 of the tooth rack gear 84 operatively engages the tooth portion 88 of the sectored drive gear 36. Movement of the tooth rack gear is achieved by a piston rod 90 having a disc like piston member 91 positioned parallel to the tooth rack gear 84 by means of connecting end plates 92 and 94 respectively. The end plates are fixed to the tooth rack gear 84 and the piston rod 90 by means of bolts 96. The disc like piston member 91 is carried within a cylinder block 98 and enclosed therein by end members 100 and 102. The piston is pneumatically actuated first in one direction, then the other by a pulse or a blast of air released in response to an electrical signal transmitted to the solenoid 20. Upon receiving the preselected electrical signal, the solenoid 20 is opened and a pulse of pressurized air is directed from an outside air source through a conventional valve system 106 controlled by the solenoid 20. A pulse of pressurized air from solenoid 20 passes through line 108 and into one end of the cylinder block 98. A second pulse of pressurized air passes through line 110 and into the other end of the cylinder block 98, forcing the piston in the other direction. The action of the piston is translated to the tooth rack gear 84 to permit a reciprocating action which in turn causes the sectored gear to move clockwise and then counterclockwise a distance equivalent to an arc of about 45°. The distance that the sectored drive gear moves is preselected and is coordinated to correspond to the number and placement of the pins carried by the pin wheel 34. For example, if the pin wheel contained six pins, the sectored gear would be designed to move an arc distance of about 60°. If the pin wheel contained twelve pins, the sectored gear, in this instance, would move an arc distance of about 30°.

Figure 2:
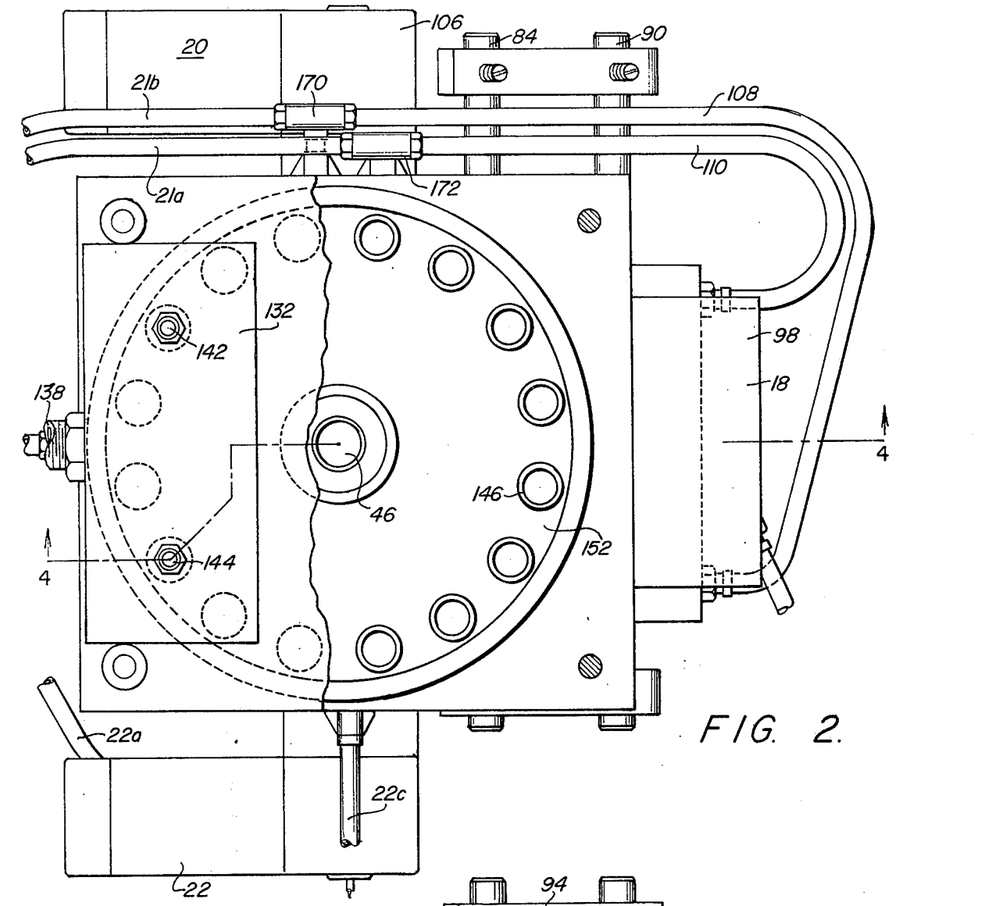
FIG. 2 is a partially broken top plan view looking along line 2—2 of FIG. 1 with the hopper removed.

The upper housing member 10 includes a bottom base plate member 120 and a centrally bored spacing block 122, which provides the separation and support between the upper and lower housings along with the brace members 25. The bottom base plate member 120 contains a centrally bored opening 124 through which the shaft 46 passes. To minimize frictional wear between the shaft 46 and the centrally bored opening of the spacer and bottom base plate member, the openings are adapted with a bronze bushing 126. In addition to the centrally bored opening, the bottom base plate member includes a pair of spaced apart openings 128 and 130, positioned along one side section of the bottom base plate member. Attached to the under side of the bottom base plate 120 is a manifold block 132 having an internally bifurcated upwardly extending channel 134 and 136 (see FIG. 2) connected to a gas inlet port and line 138. To insure a gas tight fit, about the peripheral edge of the opening, "O" ring seals 140 are provided to seal the manifold block to the bottom base plate member. As will hereinafter be described in greater detail, a pressurized gas is introduced into the bifurcated channels from the solenoid 22 at preselected time intervals through lines 22a and 22b and outwardly through outlet ports 142 and 144. A portion of the gas is directed through line 22c and a "T" connector 22d to subsequently combine with and amplify the flow of exiting powders at or near the substrate to be coated. The amplifying gas also tends to swirl the exiting powders. The gas, from outlets 142 and 144 passes through the powder metering chambers 146 filled with powder forcing the powder outwardly through one or more nozzled outlets 148 and 149 either together or sequentially as desired.

Fastened on top of the bottom base plate 120 is an intermediate block housing member 150 having a large annular bore 151 for housing a flexible rotor wheel 152 fastened to the upper end of shaft 46. The outer periphery of the flexible rotor wheel 152 is constructed from hard rubber, neoprene or plastic material having good flex characteristics. The axial portion 156 of the flexible rotor wheel or that portion fastened to the shaft 46 is constructed from a metallic material such as steel to which the flexing material is bonded. The outer peripheral portion of the flexible wheel contains a plurality of evenly spaced apart openings for receiving and holding open ended powder metering chambers 146 constructed from a metallic material such as steel. In the embodiment shown, the flexible rotor wheel contains sixteen powder metering chambers evenly spaced along a 22½° arc at or near the peripheral edge of the flexible rotor wheel. Since the movement of the flexible rotor wheel is synchronized to move a distance equivalent to an arc of 45°, or 0.785 radian, every other two powder metering chambers will be aligned with the nozzled outlets and the openings in the manifold block which are positioned in communication with the upwardly extending bifurcated channels 134 and 136. The spacings coincide with the movement of the sectored drive gear and synchronized such that as the sectored gear in cooperation with the pin wheel is actuated, a preselected pair of the powder metering chambers are placed in aligned registry with the opening in the manifold block 132 and also in aligned registry with the nozzled outlets 148 and 149.

The intermediate block housing member 150 is covered by a cover plate 160 having three bored circular openings 161, 162, and 163. Openings 161 and 162 are in alignment with openings 128 and 130 bored in the bottom base plate member 120 and openings 161a and 162a located in spacer plate 165. Opening 163 is positioned on the other side of the bottom base plate member and opposite to openings 161 and 162. Opening 163 is in communication with outlet end 165 of the powder hopper 164 fixed to a hopper base plate 164a.

The cover plate 160 is fixed to the intermediate block housing member 150 and the bottom base plate member 120 by bolts or screws 169 passing through openings 167, 167a and 167b located in the cover plate 160, the intermediate block housing 150 and the bottom base plate member 120 respectively. The annular cutout portion 151 of the intermediate block housing member 150 which is not occupied by the flexible rotor wheel 152 functions as a powder reservoir for filling the open ended powder metering chambers as they are moved therein. The reservoir is maintained full by powder falling gravitationally therein from the hopper 164 and through opening 163. The annular opening 151 of the intermediate block housing member 150 may therefore be referred to as the devices powder reservoir. To insure that the powder reservoir is maintained full at all times, and to insure that the powder will gravitationally flow from the hopper and into the reservoir, a vibrator comprising an unbalanced ball bearing race powered by a continous flow of pressurized gas through an inlet line 18a, has been found most suitable. Such a system has been described in U.S. Pat. No. 3,913,795, which is hereby incorporated into this specification by reference. A pair of nozzled outlets 148 and 149 respectively are vertically mounted to a cylinder block member 184 by screws or bolts 184a passing through openings 185 bored at each of its corners. The nozzled outlets are positioned over a pair of openings 187a and 187b bored in the cylinder block member 184 and positioned such that they are in aligned registry with openings 161a and 162a, 161 and 162, and 128 and 130. When a pulse of pressurized gas is transmitted by solenoid 20, it passes through outlets 142 and 144 and into the positioned powder metering chambers 146 aligned therewith through openings 128 and 130, 161 and 162, 161a and 162a and 187a and 187b and finally outwardly through the nozzled outlets 148 and 149.

These nozzled outlets are unique in that the nozzles are mounted to reciprocate in response to a pneumatic signal synchronized with the pneumatic signal used in actuating the sectored drive gear mechanism 23. The pressurized gas used in causing said reciprocation is generated by actuation of solenoid 20 which releases a pulse of gas sequentially through first "T" 170 and then through "T" 172 which connects into lines 108 and 21b and lines 110 and 21b respectively (see FIG. 2). This permits pneumatically operated nozzled outlets and the sectored drive gear to operate concomitantly. Since the two nozzled outlets are indentical in construction, only one of them will now be described in detail. The nozzled outlet comprises an elongated tubular member 178 (see FIG. 4) having a lower edge section 179a and an enlarged piston center 180 containing a circumferential groove for receiving "O" rings 182. The piston center 180 is housed within a cylinder block 184 which divides the cylinder into an upper and lower gas receiving chamber 186 and 188. The lower section of tubular member 178 is supported on a centrally bored base member 183 sealed against spacer plate 165. A pair of pressurized gas connectors 190 and 192 connected to lines 21b and 21a respectively, are provided to communicate with the upper and lower gas receiving chambers. Gas is introduced first into gas receiving chamber 186 through line 21b forcing the elongated tubular member downwardly and into sealing engagement with the peripheral ends of a pair of powder metering chambers 146 fixed to the flexible rotor wheel 152. Sealing engagement of the powder metering chambers is achieved by pressurized contact of its peripheral ends with annular seals 187 and 189 positioned abuttably thereto. Annular seals 187 are carried within annular grooves cut into the manifold block member 132 while annular seals 189 are carried within sleeves 191 threadably fixed to the lower end of respective tubular member 178. With the powder metering chambers sealably closed, a pulse of pressurized gas is introduced into inlet end 138 forcing the powder collected therein outwardly through the nozzled outlets 148 and 149. After the powder has been ejected, chamber 186 is evacuated and a second pulse of pressurized gas is introduced into chamber 188 via line 22a forcing the elongated tubular member 178 upwardly. This releases each engagement of the powder metering chamber with seals 187 and 189, permitting the flexible rotor wheel 152 to be freely rotated. Upon rotation a different pair of filled powder metering chambers is positioned in aligned registry with the nozzled outlets and the above described reciprocating sequence is repeated.

Figure 6:
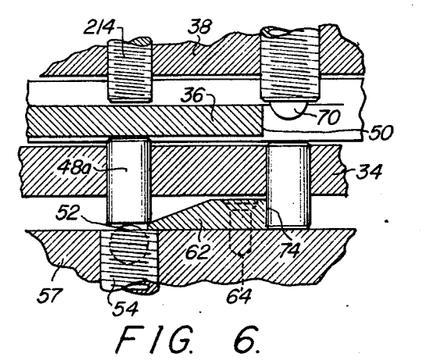
FIG. 6 is a vertical cross-sectional view of the sectored drive gear and pin arrangement taken along line 6—6 of FIG. 5.
Figure 7:
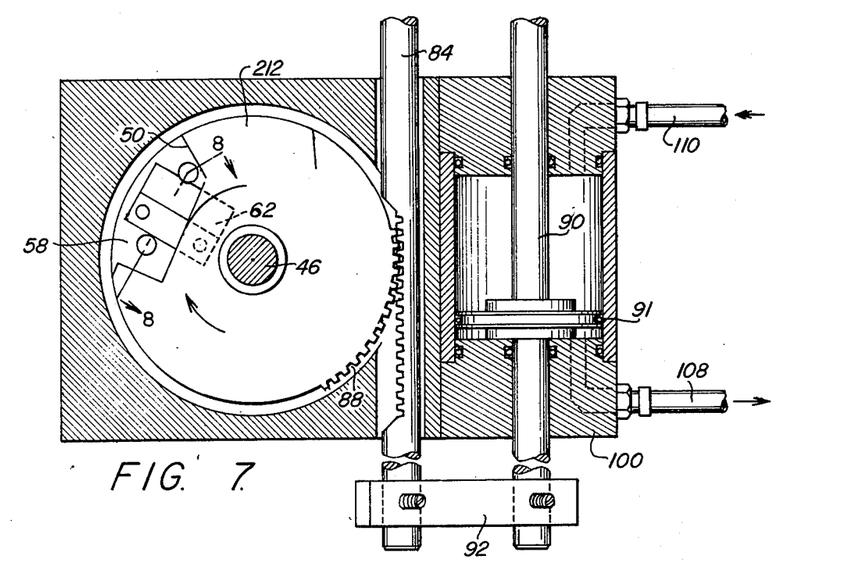
FIG. 7 is a horizontal cross-sectional view identical to that of FIG. 5 execpt that the sectored gear has been rotated 45°.
Figure 8:
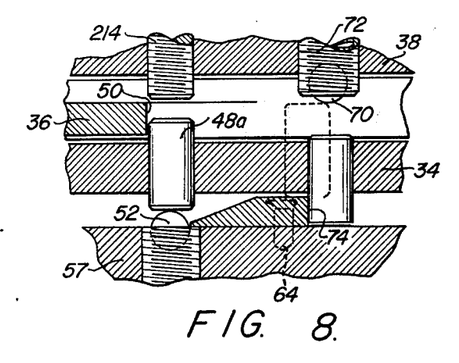
FIG. 8 is a vertical cross-sectional view taken along line 8—8 of FIG. 7 wherein the sectored drive gear and pin arrangement are shown in one of its intermediate positions.

Referring now to FIGS. 5, 7, 9, and 10, it can be seen that the sectored drive gear 36 contains an outer peripheral cut-out section 58 and a depressed or recessed section 212 extending peripherally from the edge of the cut out section 58. This depressed or recessed section 212 receives a downwardly extending stop member 214 (FIG. 6) which extends downwardly from the top cover 38 of lower housing 12. This downwardly extending stop member is positioned such that it will be directly above one of the pins 48a as it is being urged upward by the spring and ball combination 52 and 54 contained within the bottom wall 57 of the bottom base block housing member 30. The spring and ball combination is contained within a tapered bore as earlier described. The purpose of the ball and spring is to urge one of the pins 48a upwardly through the bored opening and against the driving edge 50 of the sectored drive gear 36. As the pin is urged upwardly there is a possibility that the pin can be totally ejected from the opening in the pin wheel. This is avoided by positioning the downwardly extending stop member 214 in opposed relation to the upwardly biased pin 48a. Once the pin has been urged upwardly, as shown in FIG. 8, and positioned against the driving edge 50 of the sectored drive gear 36, the pin wheel 34 is rotated approximately 45° by actuation of the tooth rack gear 84 which in turn rotates the shaft 46 fixed to the pin wheel 34. To insure that the pin 48a will continue in its upward position during its 45° rotational movement, pin 48a is directed upwardly by the inclined leading edge 60 of the inclined ramp 62. The section biased ball arrangement located in the cover plate 38 is similar in construction to the lower biasing ball previously described. Normally pin 48a will gravitationally fall from its upper position to its lower position once it passes the vertical side 74 of the ramp 62. However, to insure that the pin will position itself as shown in FIG. 6, and second biased ball arrangement is provided. It should also be noted that the lower or first biased ball arrangement is sufficiently biased so that the inclined portion of the ramp is generally not necessary to raise the pin thereover. In the event the pin is not sufficiently raised, the ramp will direct the pin 48a upwardly as shown in phantom in FIG. 8.

When the sectored drive gear 36 has completed its 45° movement, the tooth rack gear is actuated in a direction opposite its initial direction causing the sectored drive gear to return to its starting position. Since the sectored drive gear is not secured to shaft 46, it will rotate about the stationary shaft 46 while the pin wheel 34 and flexible rotor wheel 152 remain stationary. In so doing, the pin 48 is moved downwardly and against the vertical side 74 of the ramp 62, preventing the pin wheel from being inadvertently rotated. As shown in the drawings, the sectored drive gear normally drives the pin wheel 34 and the flexible rotor wheel 152 in a counter clockwise direction, by intermittent 45° movements of rotation. The sectored drive gear returns to its original starting position by the reciprocating action of the tooth rack gear 84. FIG. 8 shows the sectored drive gear in its counter clockwise or non-drive position.

Figure 9:
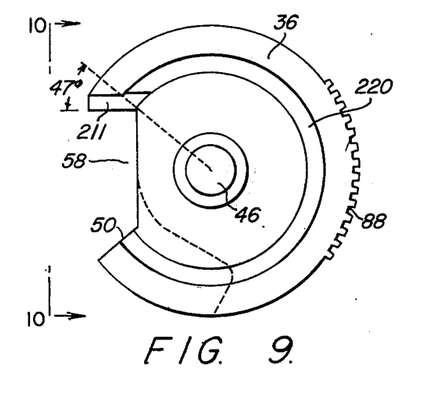
FIG. 9 is a bottom elevation of the sectored drive gear.
Figure 10:
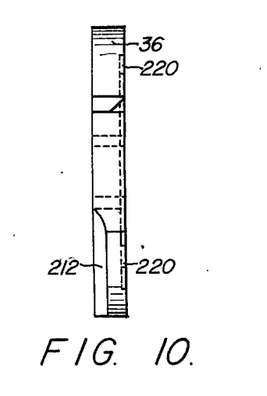
FIG. 10 is a front elevation of the sectored drive gear looking along line 10—10 of FIG. 9.

As previously mentioned and as more clearly shown in FIGS. 9 and 10, the sectored drive gear 36 has a peripheral segment 58 removed. One side of the removed segment is cut along a radial line 50 while the other is cut at an angle of about 47° from a radial line as shown in FIG. 9. The cut along the radial line is the driving edge 50 previously described. The segmented or cut-out portion 58 of the gear is positioned opposite the tooth section 88 of the sectored drive gear 36 which has a pitched involute of about 14½°. The tooth section 88 engages a correspondingly cut tooth rack gear 84 connected at its ends by connecting bars 92 and 94 which in turn is connected to a piston rod 90 housed within the cylinder 98 and actuated by pneumatic means. The recessed or depressed section 212 of the segmented drive gear previously described is designed for receiving the extended stop member 214 also previously described. Since the segmented drive gear moves only a distance of about 45°, the segmented drive gear will, in effect, oscillate first forward and then backward in direct response to the reciprocating motion of the tooth rack drive gear. On the reverse face or side of the segmented gear (FIG. 9), is an annular recess 220 for receiving the tops of the pins 48 carried within the openings 46 of the pin wheel 34. This recess or path insures that the tops of the pins 48 will not be in contact with the face of the sectored drive gear during its 45° rotational movement.

Since the pins 48 are of a length slightly greater than the depth or length of the bored openings 46 of the pin wheel 34, a small portion of the pins will extend over the top surface of the pin wheel. To prevent frictional contact of the pins with the lower or bottom face of the sectored drive gear, the annular groove 220 provides a clearance sufficient to prevent any frictional contact therewith.

In operation, the powder held within hopper 14 is gravitationally introduced into the powder reservoir through opening 163 with the aid of a vibrating means 18. The powder within the reservoir maintains the open ended powder metering chambers 146 fixed to the flexible rotor wheel 152 filled with powder. The powder metering chambers 146 are placed in aligned registry with the nozzled outlets 148 and 149 and outlet ports 142 and 144 of the manifold block 132 by a pulse of pressurized gas released by solenoid 20 into cylinder block 98. The above mentioned air pulses acutate the indexing motor 23 by first introducing gas into one side of the cylinder block 98 through line 108 and then into the other side of the cylinder block through line 110. The sequential introduction of air pulses drives the piston 91 in first one direction then in the other. The motion of the piston 91 is transferred to the tooth rack gear 84 which in turn moves the engaged sectored drive gear 36 in a counter clockwise direction. After moving a distance equivalent to about 45°, the sectored drive gear is disengaged and the sectored drive gear is rotated in a clockwise direction a distance equivalent to about 45°.

The counter clockwise movement of the sectored drive gear 36 is transferred to the pin wheel 34 by pin 48 which is being urged upwardly and against the driving or leading edge 50 of the sectored drive gear 36 by the biased ball 54. As the sectored drive gear 36 is moved clockwise to its original starting position, pin 48a is urged downwardly by biased ball 70 and against the vertical edge 74 of the ramp 62. During the clockwise movement of the sectored drive gear 36 about shaft 46, only the sectored drive gear is rotated. The shaft 46, pin wheel 34 and the flexible rotor wheel 152 remain stationary. However, during the counter clockwise movement, the pin wheel is engaged with the sectored drive gear by pin 48a. Movement of the pin wheel causes movement of the fixed shaft 46 which in turn causes the flexible rotor wheel, which is also fixed to the shaft, to move an equivalent distance. In the embodiment depicted in the drawings, the movement above referred to corresponds to an arc distance of about 45°. Upon completing the 45° movement, the metering chambers are positioned in aligned registry with the nozzled outlets. With the powder metering chambers so aligned, the electrically operated solenoid 20 emits a pulse of gas into chamber 186 which forces the tubular members 178 downwardly and against the top edge of the powder metering chamber circumscribed by seal 189. A downward motion of the cylinders cause the metering wheel to flex downward and against a peripheral seal 187 positioned around openings 142 and 144 bored in the manifold block 132 earlier described. The downward action of the cylinders will in effect seal the powder metering chambers from the powder reservoir so that upon response from the electrically operated solenoid 20, a pulse of pressurized gas will pass directly through the metering chamber and eject the powder contained therein outwardly through the nozzled outlets 148 and 149 connected at the outlet ends of the tubular members 178 respectively. After the powder has been ejected, the tubular members 178 are retracted or raised by a pulse of pressurized gas introduced into chamber 188 in response to a signal transmitted from solenoid 20. Concomitantly therewith, a pulse of pressurized gas is introduced into the fore and aft chambers of piston block 98, which actuates the tooth rack gear 84 which in turn rotates the sectored drive gear 36 about shaft 46 a distance equivalent to approximately 45°. To insure that the pin wheel does not inadvertently move in a reverse direction, pin 48a which, at first had been urged upwardly, will now be urged downwardly by the biased ball arrangement and against the vertical edge 74 of the inclined ramp 62. With the sectored drive gear in its starting position, the tooth rack gear is again actuated and the cycle initially described is repeated, that is, a pin is urged upwardly against the leading edge of the sectored drive gear, the sectored drive gear is rotated about 45° causing the pin wheel to rotate a corresponding distance which in turn positions a second pair of filled powder metering chambers in aligned registry with the tubular members connected to the nozzled outlets. A pulse of gas is then introduced into the base of the tubular members forcing the powder outwardly therefrom.

In lieu of or in addition to "O" ring seals 177 and sleeve 179, the lower portion of tubular member 178 may be curcumscribed by a flexible boot (not shown) fixed at one of its ends to the tubular member and at the other end to one of the sections comprising the upper housing. The use of a boot will prevent the inadvertant blow back of powder from the powder reservoir into chambers 186 and 188.

With the device of this invention, it is possible to eject anywhere from 30 to 60 pulses of powder per minute. The ejected powder can be directed against the internal walls of a substrate such as an open ended container and thereby coat same.

Although certain preferred embodiments have been illustrated and described herein above, it should be understood that various changes may be made without departing from the spirit and scope of the disclosed invented concept, which is limited only by the claims appended thereto.

I claim:

1. An indexing motor comprising:
   a housing,
   an elongated shaft journaled for rotation within said housing,
   a wheel member fixed to one end of said elongated shaft, said wheel member having a plurality of spaced apart openings bored annularly about said wheel member,
   a cylindrical pin loosely carried within each of said openings,
   a sectored drive gear loosely held about said shaft,
   a biasing means for sequentially urging each of said cylindrical pins into contact with an edge of said sectored drive gear,
   a means for intermittently moving said sectored drive gear while said cylindrical pin is in contact with said edge and,
   a means for returning said sectored drive gear to its initial starting position by slidably rotating said sectored drive gear about said elongated shaft while said wheel member is held stationary.

2. The indexing motor of claim 1 wherein a section of said sectored drive gear is adapted with gear teeth.

3. The indexing motor of claim 2 wherein said means for intermittently moving said sectored drive gear includes a reciprocatable tooth rack gear operatively engaged with said gear teeth of said sectored drive gear.

4. The indexing motor of claim 3 including a reciprocating piston operatively connected to said tooth rack gear.

5. The indexing motor of claim 1 including a ramp fixed to the bottom wall of said housing for insuring that said cylindrical pin will maintain contact with said edge of said sectored gear.

6. A powder ejecting device comprising, a housing having a powder inlet and powder outlet means, a powder reservoir carried within a section of said housing, an elongated shaft having an upper section rotatably mounted within said reservoir and a lower section extending beyond said reservoir, a flexible rotor wheel fixed to said upper section of said shaft, said flexible rotor wheel having a plurality of spaced apart powder metering chambers annularly fixed thereto, an indexing means for intermittently moving said shaft, ejecting means for forcing said powder from said powder metering chambers outwardly through said powder outlet means, and a reciprocatively mounted powder outlet means capable of moving against one end of said powder metering chamber and forcing same such that the other end of said powder metering chamber will seal against said ejecting means.

7. The powder ejecting device of claim 6 wherein said powder metering chambers are open ended.

8. The powder ejecting device of claim 6 wherein said ejecting means includes a gas outlet connected to a gas valve for emitting pulses of pressurized gas.

9. The powder ejecting device of claim 7 including a sealing means for communicatively sealing said powder outlet means and said ejecting means with said open ended powder metering chamber at preselected intervals.

10. A powder ejecting device comprising, a housing having a powder inlet and powder outlet means, a powder reservoir carried within a section of said housing, an elongated shaft having an upper section rotatably mounted within said reservoir and a lower section extending beyond said reservoir, a flexible rotor wheel fixed to said upper section of said shaft, said flexible rotor wheel having a plurality of spaced apart powder metering chambers annularly fixed thereto, an indexing means for intermittently moving said shaft, and ejecting means for forcing said powder from said powder metering chambers outwardly through said powder outlet means, wherein said indexing means includes a wheel member fixed to said lower section of said shaft, said wheel member having a plurality of spaced apart openings bored annularly about said wheel member, a cylindrical pin loosely carried within each of said openings, a sectored drive gear loosely held about said lower section of said shaft, a means for urging each of said cylindrical pins into engagement with an edge of said sectored drive gear and moving means for intermittently moving said sectored drive gear while said pin is in engagement therewith.

11. The powder ejecting device of claim 10 wherein said moving means includes a reciprocatable tooth rack gear operatively engaged with said sectored drive gear and actuatable in response to a preselected signal.

12. The powder ejecting device of claim 11 including a reciprocating piston operatively connected to said tooth rack gear.

13. The powder ejecting device of claim 12 wherein each of said metering chambers is open ended, and including a sealing means for communicatively sealing said powder outlet means and said ejecting means with at least one of said open ended powder metering chambers.

14. The powder ejecting device of claim 13 including a vibrating means for insuring that powder will flow from said inlet means into said powder reservoir.

15. The powder ejecting device of claim 13 wherein said sealing means includes a reciprocatively mounted powder outlet means capable of moving against one end of said open ended powder metering chambers and forcing same such that said flexible rotor wheel will flex and cause said other end of said open ended powder metering chamber to sealably contact said ejecting means.

16. The powder ejecting device of claim 15 wherein said ejecting means includes a gas outlet connected to a gas valve for emitting pulses of pressurized gas in response to a preselected signal.

17. The powder ejecting device of claim 16 wherein the preselected signals for actuating said powder ejecting means and said moving means are synchronized.

18. A method for ejecting reproducible quanta of powder through a powder outlet comprising the steps of moving a powder metering chamber which is open at opposite ends and is carried by flexible mounting means through a reservoir filled with powder, whereby to fill said powder metering chamber with powder; aligning said powder metering chamber between a reciprocatively mounted powder outlet and a pressurized gas outlet; forcing said powder outlet against one open end of said powder metering chamber, causing the mounting means carrying said powder metering chamber to flex so that the other open end of said powder metering chamber sealably engages said pressurized gas outlet; and introducing a pulse of pressurized gas into said gas outlet whereby said pulse of pressurized gas forces the powder contained within the powder reservoir outwardly through the reciprocatively mounted powder outlet.

* * * * *